Figure 1:
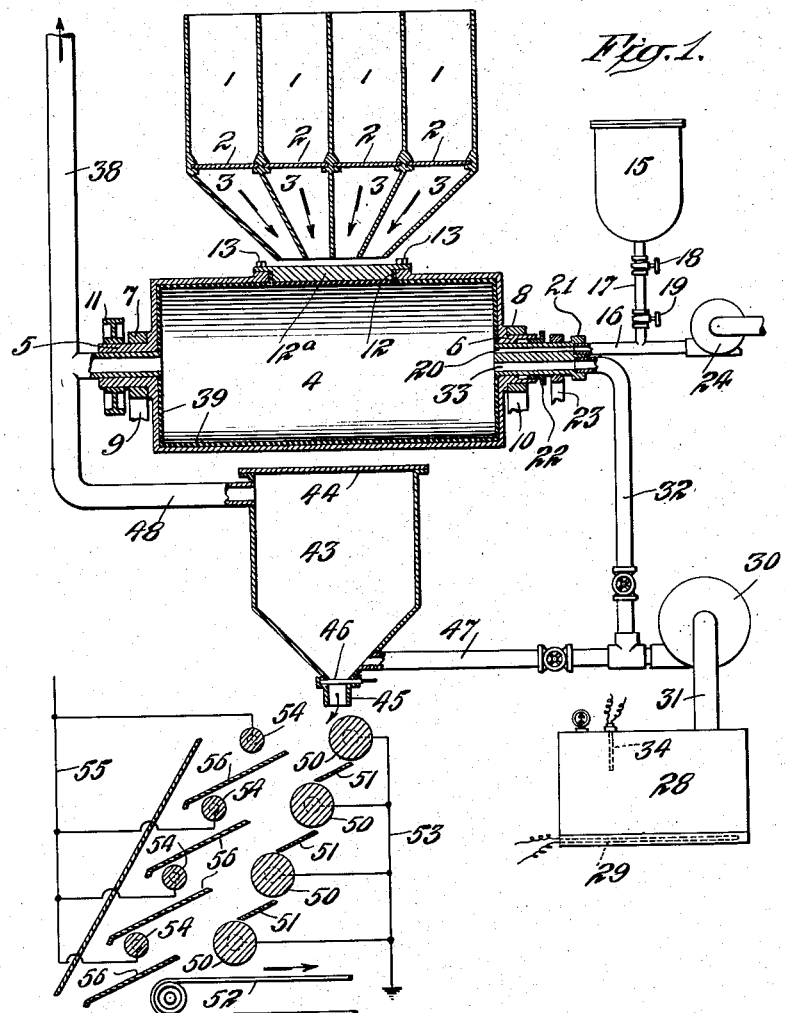

April 30, 1940.  C. H. PEDDRICK, JR., ET AL  2,198,972
METHOD OF CONCENTRATING NONMETALLIC MINERALS
Filed April 1, 1938

INVENTORS
CHARLES H. PEDDRICK, JR.
JOSEPH H. WEIS
BY Sager & Malcolm
ATTORNEYS

Patented Apr. 30, 1940

2,198,972

UNITED STATES PATENT OFFICE 2,198,972

METHOD OF CONCENTRATING NON-METALLIC MINERALS

Charles H. Peddrick, Jr., Northville, N. Y., and Joseph H. Weis, West Paris, Maine, assignors to Feldspathic Research Corporation, New York, N. Y., a corporation of Delaware Application April 1, 1938, Serial No. 199,328

4 Claims. (Cl. 209—9)

This invention relates to a method and means for concentrating minerals, particularly natural siliceous minerals such as feldspar, pyrophyllite, olivene, talc, kyanite, zircon, etc., and is a continuation in part of our application Serial No. 27,708, filed June 21, 1935.

The object of the invention is to provide an efficient and commercially practical method and means for concentrating minerals by the separation of undesired mineral substances whose physical and chemical characteristics are such that they cannot be removed by ordinary methods of treatment, and its specific object is to separate and remove free silica or quartz from natural minerals of the above and other types.

In the preferred embodiment of the invention the natural minerals are crushed, and preferably separated according to size, and are treated with an acid or gas containing a fluorine radical under temperature conditions such that the particles or granules are rendered selectively susceptible to an electrostatic field. The mixture treated in this manner is then fed to an electrostatic separator wherein the free silica is removed with a corresponding concentration of the other ingredients.

The invention will be described as applied to the separation of free silica, usually in the form of quartz, from natural minerals of the above mentioned type having physical and chemical characteristics such that the separation of the silica by physical or chemical methods is unsatisfactory.

As a specific example, the feldspar or other non-metallic mineral containing free silica or quartz may be crushed or ground, as by means of crushing rolls, to reduce the same to granular particles of suitable size such as 10 to 200 mesh. The product is preferably graded into a plurality of different ranges and each range of sizes may be treated separately.

The granular particles are then passed to a treating chamber or agitator into which a fluid acid or gas containing a fluorine radical is introduced. Hydrofluoric acid, fluosulphonic acid, or silicon tetrafluoride gas are preferred for this treatment. The treatment is performed at an elevated temperature and for a period of time sufficient such that the silica and other granules are caused to have a different electrostatic susceptibility. The optimum range of temperature for commercial operation is between 170 and 280° F. Below and above this temperature range inferior results are obtained, although an appreciable separation of free silica may be obtained at temperatures between 110 and 390° F.

The particles treated in the above manner are preferably dried and then fed to an electrostatic separator having a potential of from 5,000 to 30,000 volts, wherein the treated silica particles are caused to segregate toward one pole while the other particles segregate toward the other pole. The particles may be selectively separated into concentrates, middlings and tailings if desired, each class falling or passing into separate receptacles or bins.

It is found that the potential on the electrostatic separator may be varied according to the material and according to the previous treatment, the above values being given by way of example only.

This method may be used to process graphic granite, pegmatites and other mineral mixtures the constituents of which are differently susceptible to an electrostatic field after treatment. In some instances it is found that one ingredient may be removed under certain conditions of time, temperature and voltage and another ingredient may be removed under other conditions.

While the exact reason for the selective action is not definitely known, we ascribe it to the formation of a coating of fluorine or fluorides on the particles which, under our temperature conditions, changes their electrostatic susceptibility. Whatever may be the exact explanation or the exact nature of the coating on the particles, the separation has been found to be successfully accomplished under the conditions above specified.

Figure 2:
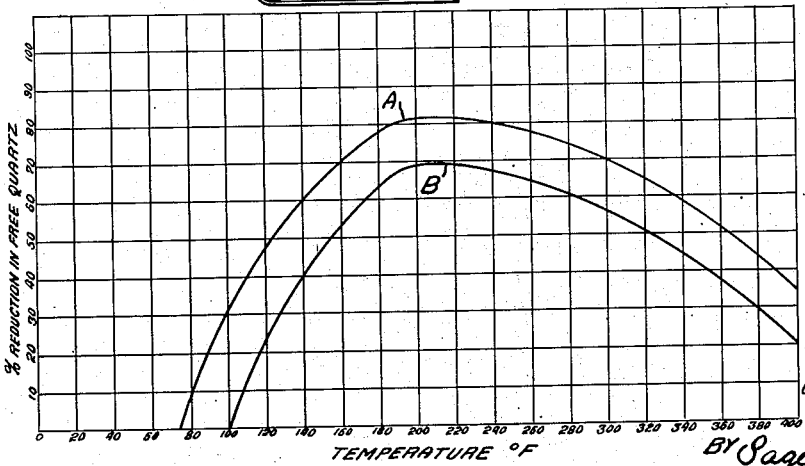

The various features and advantages of the invention will be described in connection with the accompanying drawing, in which:

Fig. 1 is a diagrammatic illustration of an apparatus which may be used in carrying out the invention; and Fig. 2 is a chart which illustrates graphically the relation of temperature to quartz separation according to the method of our invention.

In Fig. 1 of the drawing, one form of apparatus in which the above process can be carried out is shown as comprising a set of bins 1 which are adapted to receive different materials for treatment, for example non-metallic granules of different sizes. A set of gates 2 are adapted to control the discharge of material from said hoppers to chutes 3 which lead to a treating chamber or cylinder 4.

The treating cylinder 4 may be rotatably mounted as by hollow shafts 5 and 6 which may be journaled in bearings 7 and 8 respectively, carried by suitable supports 9 and 10. A driving means such as a belt pulley 11 may be secured to the shaft 5. The cylinder 4 may have a charge opening 12 closed by a cover 12a which may be secured in place by bolts 13. The opening 12 is adapted to align with the chutes 3 when it is brought to the top for receiving the charge.

The reagent may be introduced into cylinder 4 from a receiver 15 connected to an inlet pipe 16 through a measuring device comprising a pipe 17 having a pair of spaced stop cocks 18 and 19. The capacity of the pipe 17 between stop cocks 18 and 19 determines the quantity of reagent which is added to the cylinder 4 as a single charge. The inlet pipe 16 may connect with a channel 20 in an inlet block 21 which may have a running fit with the hollow shaft 6 and may be sealed thereto by a packing gland 22. The inlet block 21 may be mounted on a stationary support 23. A blower 24 may be connected to the inlet pipe 16 to force the reagent into the cylinder 4 and to mix a certain amount of air therewith.

Heated air or gases may be supplied to the cylinder 4 from a container 28 which may be heated by suitable means such as an electric heating unit 29. A blower 30 may have an intake pipe 31 connected to the container 28 and an outlet pipe 32 connected to a channel 33 in the inlet block 21. A suitable thermostat 34 may be employed to control the temperature within container 28.

The hollow shaft 6 may connect to an exhaust pipe 38. The cylinder 4 and the hollow shaft 5 have a lining 39 of a material adapted to withstand the reagent, for example a lining of rubber, lead or ceresin wax since a reagent having a fluorine radical is used. The receiver 15, inlet block 21 and other parts coming in contact with the reagent may be made of or lined with similar material.

The cylinder 4 is adapted to discharge the treated charge into a receiver 43 having a removable top 44 and terminating in a spout 45 which may be closed by a gate 46. The receiver 43 may be connected by a pipe 47 with the blower 30 and by a pipe 48 with the exhaust pipe 38, so that hot air or heated gases may be blown through said receiver.

The spout 45 is adapted to discharge the treated material to an electrostatic separator comprising a set of rolls 50 arranged with a series of baffles 51 so that the material falls in succession from one roll to the next and finally is discharged onto a conveyor 52 by which it is collected and conveyed to a convenient receiver (not shown). The rolls 50 constitute one pole of the electrostatic separator and may, for example, be connected to ground by a line 53. The opposite pole may comprise a set of rods 54 which may be connected to a source of high potential by a line 55. The rods 54 may be located above chutes 56 which discharge to a suitable discard receiver (not shown).

In the operation of this apparatus the feldspar or other non-metallic mineral is crushed and graded and the different grades are stored in the various bins 1. The different grades are preferably treated separately as a more uniform product is thus obtained. A gate 2 is then operated to release the material from one bin into cylinder 4, after which the cover 12 is secured in place.

The reagent, for example hydrofluoric acid, fluosulphonic acid, or silicon tetrafluoride gas, is withdrawn from the receiver 15 by first opening the stop cock 18 with the stop cock 19 closed so as to fill up the intervening pipe 17, then closing the stop cock 18 and opening the stop cock 19 to admit the measured quantity to pipe 16, whence it is blown by the blower 24 into cylinder 4. Warm air at 110 to 390° F., but preferably between 170 and 280° F., is also blown into the cylinder 4 from container 28 by blower 30.

The cylinder 4 is rotated until the desired reaction has taken place. It is then stopped and the contents discharged into receiver 43. It may remain in this receiver a further period, if desired, under the influence of heat supplied from the blower 30 and is then passed to the electrostatic separator. Under the influence of the electrostatic field the treated particles of free silica are segregated toward the rods 54 and fall down chutes 56 into the discard. The concentrate, reduced in silica, falls onto conveyor 52 and is recovered for use.

The chart of Fig. 2 shows the relation of temperature to quartz separation according to the above method, this chart representing tests made on feldspar mined and processed at Spruce Pine, North Carolina. Two curves A and B are illustrated, comprising a band or range of results due to various irregularities in operation such as in the feed rate, acid rate, static irregularities, etc., which could not be controlled.

The curves A and B show that practically no separation of quartz from the feldspar takes place until the temperature of treatment with the fluorine reagent is raised above 75–100° F. range representing the lower limits of the band. The optimum range of temperature for commercial operation, illustrated by Fig. 2, is between 170 and 280– F., and both above and below these temperatures the percent reduction in free quartz content with respect to temperature falls off rapidly. However, while inferior results are obtained outside the stated range of 170–280° F., it will nevertheless be noted that an appreciable separation of free quartz may be obtained at temperatures ranging all the way from 110 to 390° F.

In order to further illustrate the advantages of the above method of concentration, we give below certain specific examples of the composition of feldspars before and after treatment:

|  | #1 original feldspar | #2 original feldspar | #3 original feldspar |
|---|---|---|---|
| $SiO_2$ | 74.96 | 71.3 | 76.4 |
| $Al_2O_3$ | 14.89 | 17.4 | 14.2 |
| $Fe_2O_3$ | .07 | .1 | .10 |
| $CaO$ | .30 | 2.3 | .04 |
| $K_2O$ | 6.97 | 3.8 | 3.5 |
| $Na_2O$ | 2.75 | 4.8 | 5.1 |
| Loss | .20 | .2 | .2 |
|  | 100.14 | 99.9 | 99.54 |

|  | Concentrate No. 1 | Concentrate No. 2 | Concentrate No. 3 |
|---|---|---|---|
| $SiO_2$ | 67.02 | 65.50 | 67.0 |
| $Al_2O_3$ | 18.76 | 20.63 | 18.86 |
| $Fe_2O_3$ | .04 | .04 | .05 |
| $CaO$ | 2.48 | 2.74 | 2.48 |
| $K_2O$ | 3.74 | 7.42 | 3.74 |
| $Na_2O$ | 7.71 | 3.35 | 7.61 |
| Loss | .21 | .20 | .21 |
|  | 99.96 | 99.88 | 99.95 |

Of course, the number and arrangement of electrodes in the electrostatic separator may be changed as required. The chutes 56 may likewise be omitted if other means are provided to collect the tailings. The treatment may be repeated to further concentrate the mineral, or it may be repeated under different conditions to remove other ingredients. Also, since only one specific embodiment of the invention has been set forth for purposes of illustration, it will be evident that various other changes may be made in the details of construction and method of operation without departing from the scope and spirit of the invention as defined by the appended claims.

The invention claimed is:

1. Method of reducing the silica content of minerals which comprises reducing the minerals to fine particles, agitating said particles with a reagent of the class consisting of hydrofluoric acid, fluosulphonic acid and silicon tetrafluoride gas while simultaneously subjecting same to a temperature of from 110 to 390° F. for a period of time sufficient to render the different mineral particles selectively susceptible to an electrostatic field, subsequently drying the treated particles, and then subjecting the dried particles to an electrostatic field to cause particles of silica to segregate from the remaining constituents.

2. Method of reducing the free silica content of minerals which comprises reducing same to finely divided particles, treating the particles with a reagent containing a fluorine radical while simultaneously subjecting same to a temperature of from 110 to 390° F. for a period of time adapted to render the particles selectively susceptible to an electrostatic field, and subjecting the treated particles to an electrostatic field under conditions to cause the free silica particles to selectively segregate from the remaining constituents.

3. Method of reducing the free silica content of minerals which comprises reducing same to finely divided particles, treating said particles with a reagent containing a fluorine radical while simultaneously subjecting same to a temperature of 170 to 280° F. for a period of time sufficient to materially increase their selective susceptibility to an electrostatic field, and then subjecting the treated particles to an electrostatic field to cause the free silica particles to selectively segregate from the remaining constituents.

4. Method of reducing the free silica content of minerals which comprises reducing same to finely divided particles, separating said particles into different batches according to size and separately treating each batch with a reagent containing a fluorine radical while simultaneously subjecting same to a temperature of 170 to 280° F. for a period of time sufficient to materially increase their selective susceptibility to an electrostatic field, drying the treated particles, and then subjecting the dried particles to an electrostatic field to cause the free silica particles to selectively segregate from the remaining constituents.

CHARLES H. PEDDRICK, Jr.
JOSEPH H. WEIS.